US006786326B2

(12) United States Patent
Hiramoto et al.

(10) Patent No.: US 6,786,326 B2
(45) Date of Patent: Sep. 7, 2004

(54) CHAIN CONVEYING APPARATUS FOR SPOUTS OR BAGS WITH SPOUTS

(75) Inventors: Shinichi Hiramoto, Iwakuni (JP); Shoji Tsutsui, Iwakuni (JP)

(73) Assignee: Toyo Jidoki Co., Ltd., Tokyo (JP)

( * ) Notice: Subject to any disclaimer, the term of this patent is extended or adjusted under 35 U.S.C. 154(b) by 0 days.

(21) Appl. No.: 10/392,260

(22) Filed: Mar. 19, 2003

(65) Prior Publication Data

US 2003/0178287 A1 Sep. 25, 2003

(30) Foreign Application Priority Data

Mar. 19, 2002 (JP) ....................................... 2002-076867

(51) Int. Cl.[7] .............................................. B65G 15/10
(52) U.S. Cl. .................. 198/817; 198/836.2; 198/836.3
(58) Field of Search ........................... 198/836.3, 836.2, 198/817

(56) References Cited

U.S. PATENT DOCUMENTS 4,542,820 A * 9/1985 Maxner ...................... 198/817
4,802,571 A * 2/1989 Born et al. ................. 198/817
4,874,081 A * 10/1989 Kondo .................... 198/803.9
5,029,696 A * 7/1991 Van Tilburg ............. 198/626.1
5,145,055 A * 9/1992 Kondo .................... 198/803.9
5,553,698 A * 9/1996 Patois et al. ............. 198/626.1
6,131,724 A * 10/2000 Hirasawatu et al. ........ 198/681
6,142,293 A * 11/2000 Ozawa et al. ............... 198/837
6,382,399 B2 * 5/2002 Simkowski .............. 198/626.1

* cited by examiner

*Primary Examiner*—Douglas Hess
(74) *Attorney, Agent, or Firm*—Koda & Androlia

(57) ABSTRACT

A chain conveying apparatus for spouts or bags having spouts, including a pair of annular chains. The attachment plates are provided on the respective oppositely-rotating annular chains so that the attachment plates have play in a vertical direction. Centering guide members are disposed so as to be close to the axial portions of the spouts so as to regulate the movements of the spouts in the direction perpendicular to the attachment plates' moving direction; upper-side guide members and lower-side guide members are disposed above and below the attachment plates so as to regulate the height position of the attachment plates; and flange regulating members are disposed so as to be above the flanges of the spouts, which is being conveyed, with a narrow gap between the flange regulating members and the flanges so as to regulate an upward movement of the spouts.

4 Claims, 6 Drawing Sheets

CHAIN CONVEYING APPARATUS FOR SPOUTS OR BAGS WITH SPOUTS

BACKGROUND OF THE INVENTION

1. Field of the Invention

The present invention relates to a chain conveying apparatus for spouts or bags with spouts.

2. Prior Art

The chain conveying apparatus disclosed by the present applicant in Japanese Patent Application No. 2000-305427 (Japanese Patent Application Laid-Open (Kokai) No. 2002-114367) includes a pair of annular chains mounted on sprockets of the same diameter.

The annular chains are disposed horizontally and parallel to each other in the same plane with a predetermined gap between these chains. In this chain conveying apparatus, numerous attachment plates (bridge-form rails) are attached to the respective chains in an outward facing orientation. When two chains are rotated at a constant speed in opposite directions, the attachment plates of the respective chains are respectively lined up in a concentrated manner in the respective directions of movement in the rectilinear portion, and the attachment plates of both chains face each other across a predetermined gap, so that an overall configuration resembling that of a pair of rails is adopted, and these rails move in one direction as the chains rotate.

When bags with spouts are introduced into this chain conveying apparatus, the axial portions of the spouts enter into the gap between the attachment plates on the left and right sides, and these left and right attachment plates enter into the gaps between the flanges of the spouts. As a result, the bags with spouts are conveyed in the direction of movement of the attachment plates with the left and right flanges of the spouts riding on the left and right attachment plates.

When the rotational speed of the chains of this chain conveying apparatus is increased, even if the bags with spouts are in a densely concentrated state on the rails that are lined up on the upstream side, these bags are conveyed in a state in which gaps are opened between the bags, and the bags are fed out toward the downstream side. In this case, this is convenient for counting the number of bags with spouts.

Meanwhile, when the bags with spouts are stopped at an intermediate point in the conveying process by a stopper, etc., such bags positioned further toward the rear gradually accumulate in a densely concentrated state. Accordingly, this apparatus can also be used as an accumulating apparatus of the type described in, for example, Japanese Patent Application Laid-Open (Kokai) No. 2001-48342. Furthermore, while the bags with spouts accumulate in a densely concentrated state, the flanges slide over the attachment plates.

Spouts that are currently used have the structure disclosed in, for example, the above-described Japanese Patent Application No. 2000-305427 and Japanese Patent Application Laid-Open (Kokai) No. 2001-353793. In such spouts, flanges are formed in three tiers. The upper surface sides of the upper flanges are reinforced, and ribs R which have a length that is more or less the same as the width of the flanges (width in the conveying direction) are formed on the left and right so as to face the conveying direction between the upper and middle flanges (see FIG. 6). Furthermore, the front and rear corner portions Ra and Rb of the ribs R are beveled. Meanwhile, in another type of spout that is currently used, as shown in FIGS. 2 and 7, there is no reinforcement of the upper flange, and no left or right ribs are present; and the thickness of the flanges is relatively small.

In cases where the spouts conveyed have the structure of three tiers with the reinforced upper flanges, and with ribs R, the spouts can be received from the rails on the upstream side, conveyed and fed out onto the rails on the downstream side with relatively little problem by the conveying apparatus.

However, in cases where the spouts conveyed have the structure with no reinforced upper flanges, with no left or right ribs, and with the small thickness flanges, as shown in FIG. 7, there are several problems. When the spouts are accumulated on the conveying apparatus, the flanges F of the preceding and following spouts S overlap with each other. Furthermore, when the conveying apparatus receives spouts from the rails on the upstream side or when the spouts are accumulated on the conveying apparatus, the corner portions 1*a* and 2*a* of the attachment plates 1 and 2 may catch the corners X*a* of the axial portions X of the spouts S, and the orientation of the spouts S is disturbed. Also, since the flanges F are thin and there is no reinforcement, warping tends to occur in the flanges F, and this tendency is exacerbated by the fact that warping tends to occur in the attachment plates 1 and 2 (warping to a height of 1 mm is not unusual) when the attachment plates are fastened to the connecting pins of the chains.

Furthermore, in the case of spouts that have the structure of three tiers, the overlapping of the flanges F of the preceding and following spouts S with each other is prevented by the ribs R□ Moreover, since the front and rear corner portions R*a* and R*b* of the ribs R are beveled, these corner portions do not catch on the corner portions 1*a* and 2*a* of the attachment plates 1 and 2.

SUMMARY OF THE INVENTION

The present invention was devised in light of current situations in which there are different spouts that have various structures.

The object of the present invention is to provide a chain conveying apparatus that prevents the above-described problems in prior art apparatuses even in the case that spouts that would causes problems occurring in conventional chain conveying apparatuses are processed.

The present invention is for a chain conveying apparatus for spouts or bags that have spouts thereon. In other words, the apparatus of the present invention includes a pair of annular chains on which a plurality of attachment plates are provided so that the attachment plates are set in an outward facing orientation; and in this apparatus: the annular chains are installed side by side on the same plane with a predetermined gap in between; the annular chains are rotated in opposite directions from each other and at a same speed and are moved along adjacent parallel tracks over a predetermined range; the attachment plates of respective chains are lined up in respective directions of movement in such a predetermined range; and the attachment plates of both chains face each other across a predetermined gap for the length of the above-described predetermined range so that flanges of the spouts are carried on the attachment plates and conveyed.

In the unique structure employed by the present invention in such a chain conveying apparatus:

- the attachment plates are attached to the respective chains so that the attachment plates have play in a vertical direction; and along the above-described predetermined range:

left and right centering guide members are disposed at a height through which the axial portions of the spouts pass, the centering guide members regulating the movements of the spouts in the left and right direction, upper-side guide members and lower-side guide members are disposed above and below the attachment plates of the respective chains so as to regulate the height position of the attachment plates, and left and right flange regulating members are disposed so as to be above the flanges of the spouts, which is being conveyed, with a predetermined gap between the left and right flange regulating members and the flanges so as to regulate an upward movement of the spouts.

Thus, in the above-described chain conveying apparatus, the centering guide members regulate the movement of the spouts to the left and right (in other words, the centering guide members are disposed in close proximity to the axial portions of the spouts). Accordingly, the left and right gaps of the attachment plates can be wider than usual, and it is only sufficient to support only the left and right end portions of the flanges (in other words, it is not necessary to support the flanges to any great depth in the flanges (i.e., to points near the axes of the spouts)); and with such a structure, the flanges of the spouts will not slip off of the attachment plates.

In order to prevent the flanges of the spouts from overlapping with each other on the attachment plates, it is necessary to narrow the gap between the flanges and the flange regulating members that are disposed above the flanges, so that the flanges contact the flange regulating members when the spouts are moved upward, thus regulating the movement of the spouts. More specifically, it is necessary to set the gap between the flanges and the flange regulating members at a value that is less than one time the thickness of the flanges. Furthermore, the flanges that are regulated by the flange regulating members can be the same as the flanges that ride on the attachment plates or can be other flanges.

In the above-described chain conveying apparatus of the present invention, it is preferable to have the structure as described below for instance. Namely, the attachment plates are held between the upper-side guide members and the lower-side guide members and slide between these guide members. In this case, the upper-side guide members are free to move upward and downward and are constantly driven downward so that the upper-side guide members contact the attachment plates. Furthermore, the upper side guide members and the flange regulating members are free to move upward and downward as an integral unit. If necessary, furthermore, relief grooves that allow room to accommodate even warped flanges can be formed in the upper surfaces of the attachment plates and/or the undersurfaces of the flange regulating members in the vicinity of the inside end portions of these elements.

DETAILED DESCRIPTION OF THE INVENTION

The chain conveying apparatus of the present invention will be described bellow with reference to FIGS. 1 through 5.

Figure 1:
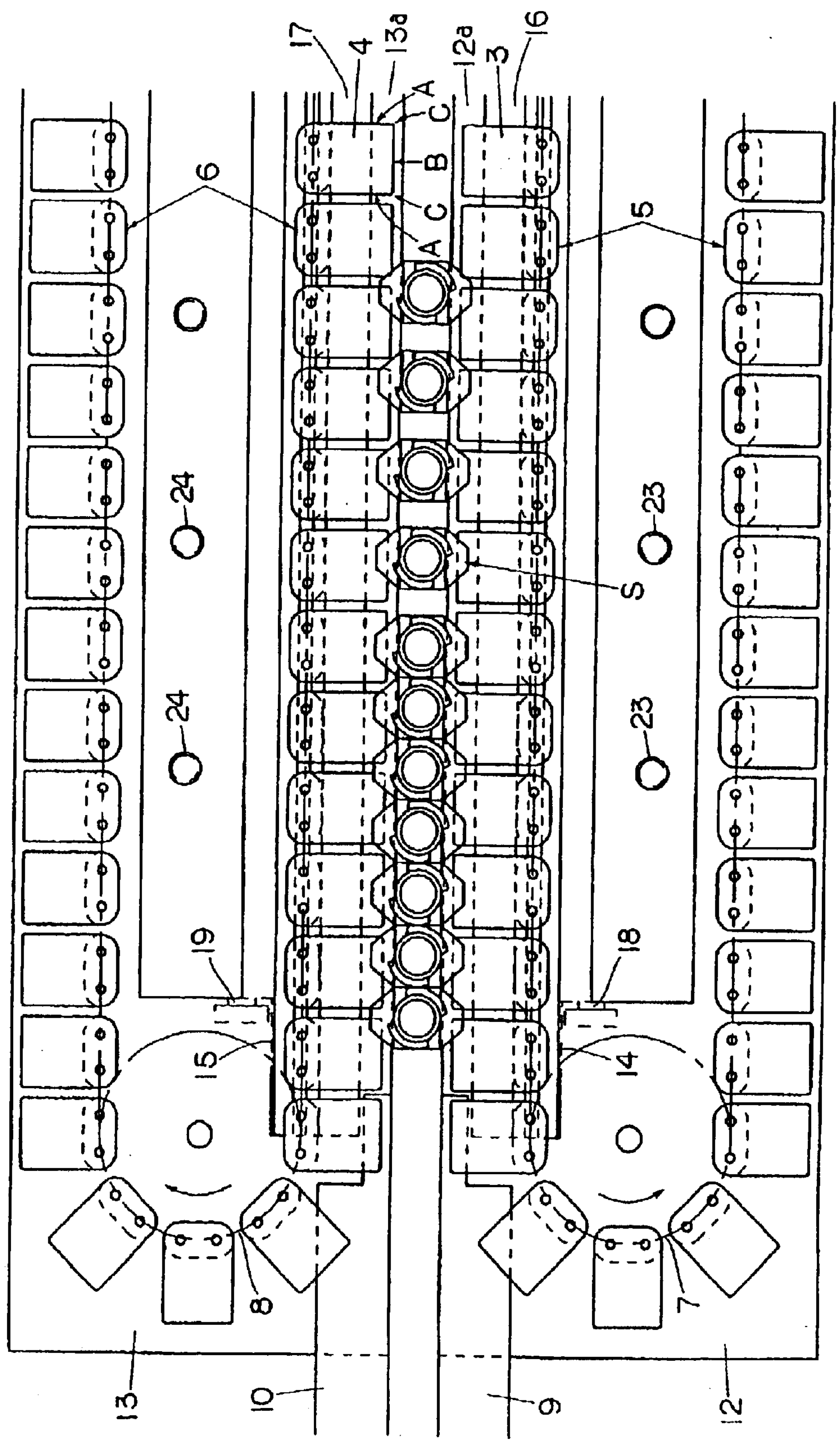
FIG. 1 is a top view of the chain conveying apparatus according to the present invention with pivot members, etc, omitted.

In this chain conveying apparatus, as shown in FIG. 1, two annular chains 5 and 6 on which attachment plates 3 and 4 are provided so as to face outward for each pin link are respectively mounted on sprockets (only the sprockets 7 and 8 on the exit side are shown) that have the same diameter. The annular chains 5 and 6 are disposed parallel to each other on the same horizontal plane with a predetermined gap between the two chains 5 and 6.

The chains 5 and 6 rotate in opposite directions at the same speed. The respective attachment plates 3 and 4 form straight linear rows in the direction of movement (with a slight gap between the attachment plates 3 and 4) between the two chains 5 and 6. Two rows of attachment plates 3 and 4 face each other across a predetermined gap. Along this rectilinear region of a predetermined length where both sets of attachment plates 3 and 4 form straight rows facing each other, the two sets of attachment plates 3 and 4 as a whole form a configuration resembling a pair of rails and are moved toward the exit side (left side in FIG. 1) as the chains 5 and 6 rotate.

On the exit side of the chains 5 and 6, guide rails 9 and 10 are disposed so that these guide rails 9 and 10 are beneath the attachment plates 3 and 4 in a partially covered configuration. As a result, the spouts S are received by these guide rails 9 and 10 from the attachment plates 3 and 4 that are moved while gradually increasing the spacing between the plates 3 and 4.

The above points are the same as that shown in the conventional chain conveying apparatus disclosed in Japanese Patent Application Laid-Open (Kokai) No. 2002-114367.

Figure 2:
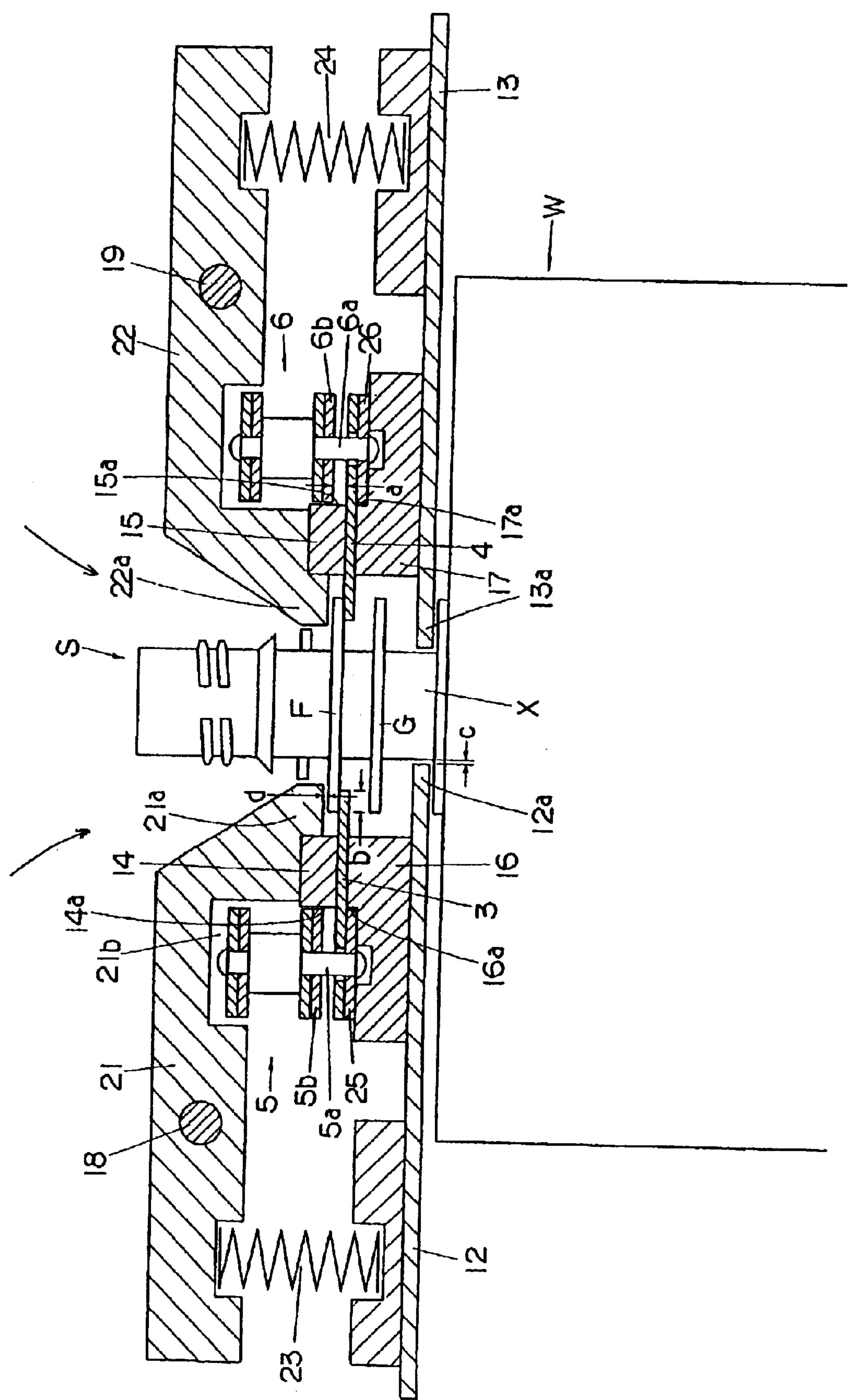
FIG. 2 is a sectional side view thereof.

In the above chain conveying apparatus, as shown in FIG. 2, the attachment plates 3 and 4 are attached to the connecting pins **5*a* and 6*a* of the respective chains 5 and 6 so that the attachment plates 3 and 4 have a certain amount of play in the vertical direction and can be moved upward and downward for a predetermined distance (the distance of this play is, for instance, approximately 1 to 2 mm). In other words, the attachment plate 3 is loosely fitted on the connecting pin 5*a*, and the attachment plate 4 is likewise loosely fitted on the connecting pin 6*a*, so that the attachment plates 3 and 4 are vertically movable for a predetermined distance on the connecting pins 5*a* and 6*a***, respectively.

Along the entire length of the above-described rectilinear region, upper-side guide members 14 and 15 and lower-side guide members 16 and 17 that regulate the height position of the attachment plates 3 and 4 are disposed above and below the frames 12 and 13, respectively. Insides of the frames 12 and 13 serve as centering guide members **12*a* and 13*a* that regulate the movement of the spouts S in the left and right directions. In other words, the frames 12 and 13 regulate the horizontal movement of the spouts S in a direction that is perpendicular to the direction in which the attachment plates are moved by the chains 5 and 6** in the above-described rectilinear region.

The upper-side guide member 14 and 15 are respectively fastened to points that are near the inside ends of pivot members 21 and 22. The pivot members 21 and 22 are pivotally attached to supporting shafts 18 and 19, respectively, which are fastened to the frames 12 and 13.

A compression spring 23 is disposed between the point that is near the outside end of the pivot members 21 and the frame 12; and likewise, a compression spring 24 is disposed between the point that is near the outside end of the pivot member 22 and the frame 13. The pivot members 21 and 22 are lightly driven by the compression springs 23 and 24 in the direction that causes the pivot members 21 and 22 to pivot into an inward facing attitude as shown by curved arrows in FIG. 2. Accordingly, the upper-side guide members 14 and 15 are free to move upward and downward, and they are also lightly driven in the downward direction in a constant fashion.

The inside ends of the pivot members 21 and 22 are provided so that they are positioned above the flanges F (of spout S) riding on the attachment plates 3 and 4, and these inside ends function as flange regulating portions 21*a* and 22*a* which are called "flange regulating members" in the present invention. The flange regulating members (the flange regulating portions 21*a* and 22*a*) regulate the upward movement of the spouts S so as to prevent the flanges F from overlapping on the attachment plates 3 and 4.

The flange regulating portions 21*a* and 22*a* are moved upward and downward as an integral unit with the upper-side guide members 14 and 15. Accordingly, the gap between the undersurfaces of the upper-side guide members 14 and 15 and the undersurfaces of the flange regulating portions 21*a* and 22*a* are maintained at a constant value at all time.

Recessed sections 21*b* and 22*b* are formed in the pivot members 21 and 22 at locations outside of where the upper-side guide members 14 and 15 are attached. The chains 5 and 6 are moved along these recessed sections 2*b* and 22*b*. In this case, the outside surfaces 14*a* and 15*a* of the upper-side guide members 14 and 15 function as guides for the pin links 5*b* and 6*b* of the chains 5 and 6, and step portions 16*a* and 17*a* which are formed slightly further to the outside than the inside ends of the lower-side guide members 16 and 17 function as guides for the attachment plate stoppers 25 and 26.

The attachment plates 3 of the chain 5 are positioned between the undersurface of the upper-side guide member 14 and the upper surface of the lower-side guide member 16, and the attachment plates 4 of the chain 6 are positioned between the undersurface of the upper-side guide member 15 and the upper surface of the lower-side guide member 17; and that the attachment plates 3 and 4 are moved in a horizontal state while sliding between these surfaces. The upper-side guide members 14 and 15 and lower-side guide members 16 and 17 can be formed from, for instance, a synthetic resin that has a small coefficient of friction.

The attachment plates 3 and 4 are not fastened to the connecting pins 5*a* and 6*a* of the chains 5 and 6. Accordingly, the attachment plates 3 and 4 show little warping and thus can be maintained horizontally at the same height when they are moved. Even if warping does occur, the upper-side guide members 14 and 15 can move slightly upward and absorb this warping.

Furthermore, even if there is some shaking movement in the moving chains 5 and 6, since the attachment plates 3 and 4 are attached to the chains 5 and 6 with a certain amount of play in the vertical direction, the attachment plates 3 and 4 show almost no shaking movement in the vertical direction.

The gap between the left and right attachment plates 3 and 4 is set so that the tip ends of the attachment plates 3 and 4 do not reach the vicinity of the axial portion X of the spout S. In other words, the gap between the left and right attachment plates 3 and 4 is set so that only the left and right end portions of the flange F are supported by the attachment plates 3 and 4 (for example, the supported width b on either (left and right) side is 1.5 to 2.5 mm).

The gap between the centering guide members 12*a* and 13*a* that regulate the horizontal movement of the spouts S to the left and right is set so that the tip ends of the centering guide members 12*a* and 13*a* approach more closely to the axial portion X (of the spout S) than the attachment plates 3 and 4. In other words, it is preferable that the tip ends of the centering guide members 12*a* and 13*a* reach a point that is in extremely close proximity to the axial portion X (so that the distance c of the gap is, for instance, 0.3 to 0.8 mm).

Since the movement of the spouts S to the left and right (or the horizontal movement) is regulated by the centering guide members 12*a* and 13*a* (i.e., the spouts S are centered in the gap between two chains 5 and 6 by the centering guide members 12*a* and 13*a*), the flanges F of the spouts S are prevented from slipping off of the attachment plates 3 and 4 even if the width b of the flanges F that is supported by the attachment plates 3 and 4 is smaller than in a conventional system. Furthermore, even if the flanges F should catch on the undersurfaces of the flange regulating portions 21*a* and 22*a* (this will be described below) so that a conveying pressure is generated, disturbance of the orientation of the spouts S and twisting of the spouts S, etc. can be suppressed by the centering action.

Figure 3:
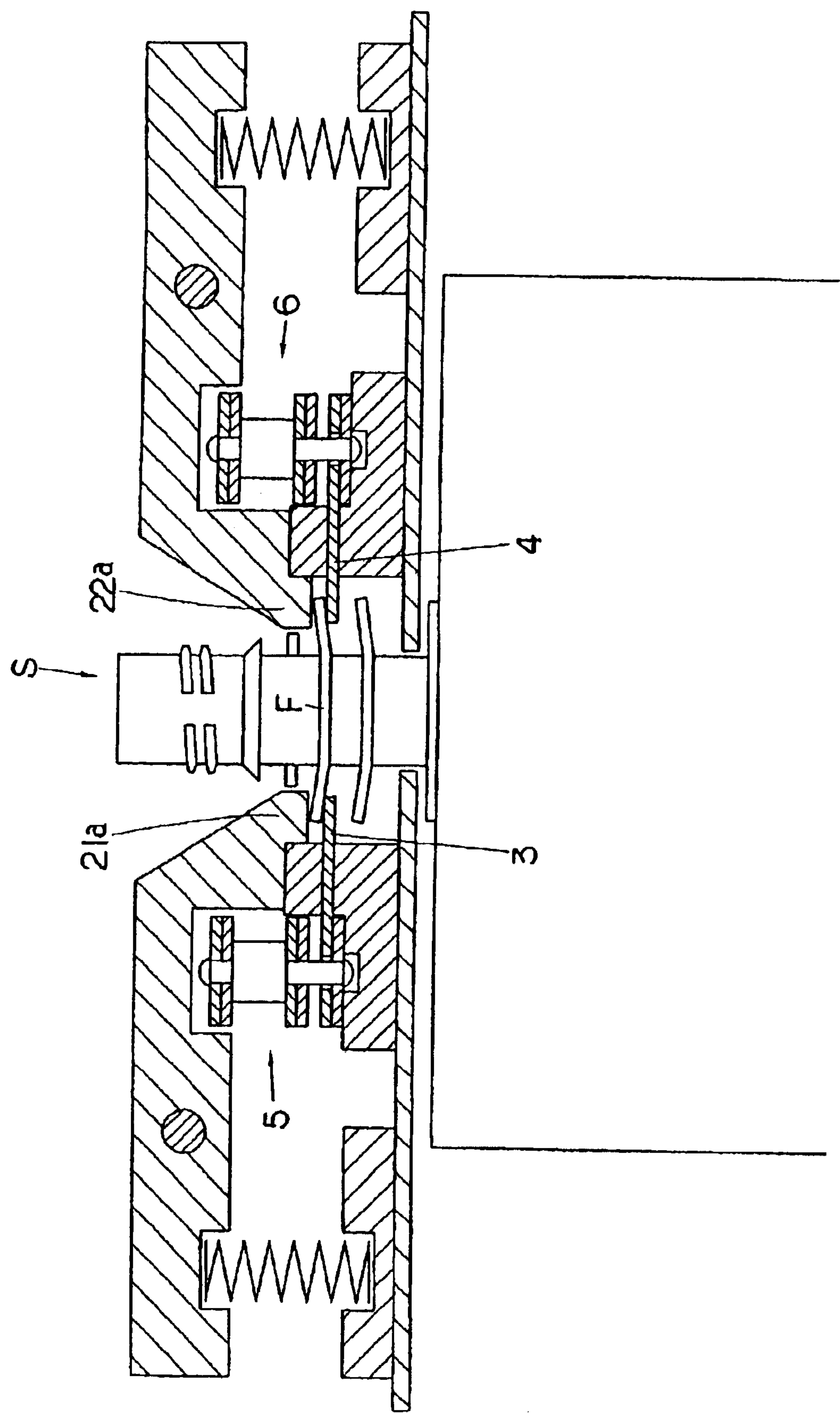
FIG. 3 is a sectional side view thereof, conveying spouts with flanges thereof having warping.

In the above structure of the present invention, the flanges F of the spouts S are supported at their left and right end portions by the attachment plates 3 and 4. Accordingly, even if warping occurs in the flanges F as shown in FIG. 3, this warping has no great effect. Conversely, in cases where the flanges F are supported to a point deep inside by the attachment plates 3 and 4, then the effects of warping of the flanges F cause the spouts S to become loose, the flanges F of the spouts S catch on the undersurfaces of the flange regulating portions 21*a* and 22*a*, so that a conveying pressure is generated, the orientation of the spouts is disturbed, causing twisting of the spouts. A smooth movement of the spouts is thus hindered.

Furthermore, in the above structure of the present invention, contact of the corner portions of the attachment plates 3 and 4 with the corners of the axial portions of the spouts S is avoided.

The difference in height between the undersurfaces of the flange regulating portions 21*a* and 22*a* and the upper surfaces of the spouts S (the upper surface being assumed to be flat), i.e., the width d of the gap between the undersurfaces of the flange regulating portions 21*a* and 22 and the spouts S, is set at a value that is less than one time the thickness of the flanges F of the spouts S. This setting is made in order to restrict the upward movement of the spouts S to a degree that exceeds the thickness of the flanges F, thus preventing overlapping of the flanges F.

The effect in preventing the overlapping of the flanges F increases higher as the width d of the gap decreases. On the other hand, if this width d is too small, then the flanges F of the spouts S will catch on the undersurfaces of the flange regulating portions 21*a* and 22*a* in cases where warping occurs in the flanges F, and a conveying pressure is generated and smooth movement is hindered. Accordingly, it is desirable that the width d be set at approximately 0.2 to 0.5 times the thickness of the flanges F of the spouts S.

In the structure described above, the flanges that are regulated by the flange regulating members are the same flanges as those riding on the attachment plates. However, it is also possible to regulate other flanges (that are not riding on the attachment plates). For example, it is possible to cause the middle flanges G (see FIG. 2) to ride on the attachment plates and to dispose the flange regulating members above the upper flanges F.

Furthermore, it is desirable that the respective corners A through C of the attachment plates (see FIG. 1) be beveled with a curved surface. Here, A is the corner formed by the side surface perpendicular to the conveying direction (for spouts S) and the upper surface, B is the corner formed by the side surface parallel to the conveying direction and the upper surface, and C is the corner formed by the side surface perpendicular to the conveying direction and the side surface parallel to the conveying direction.

Figure 4:
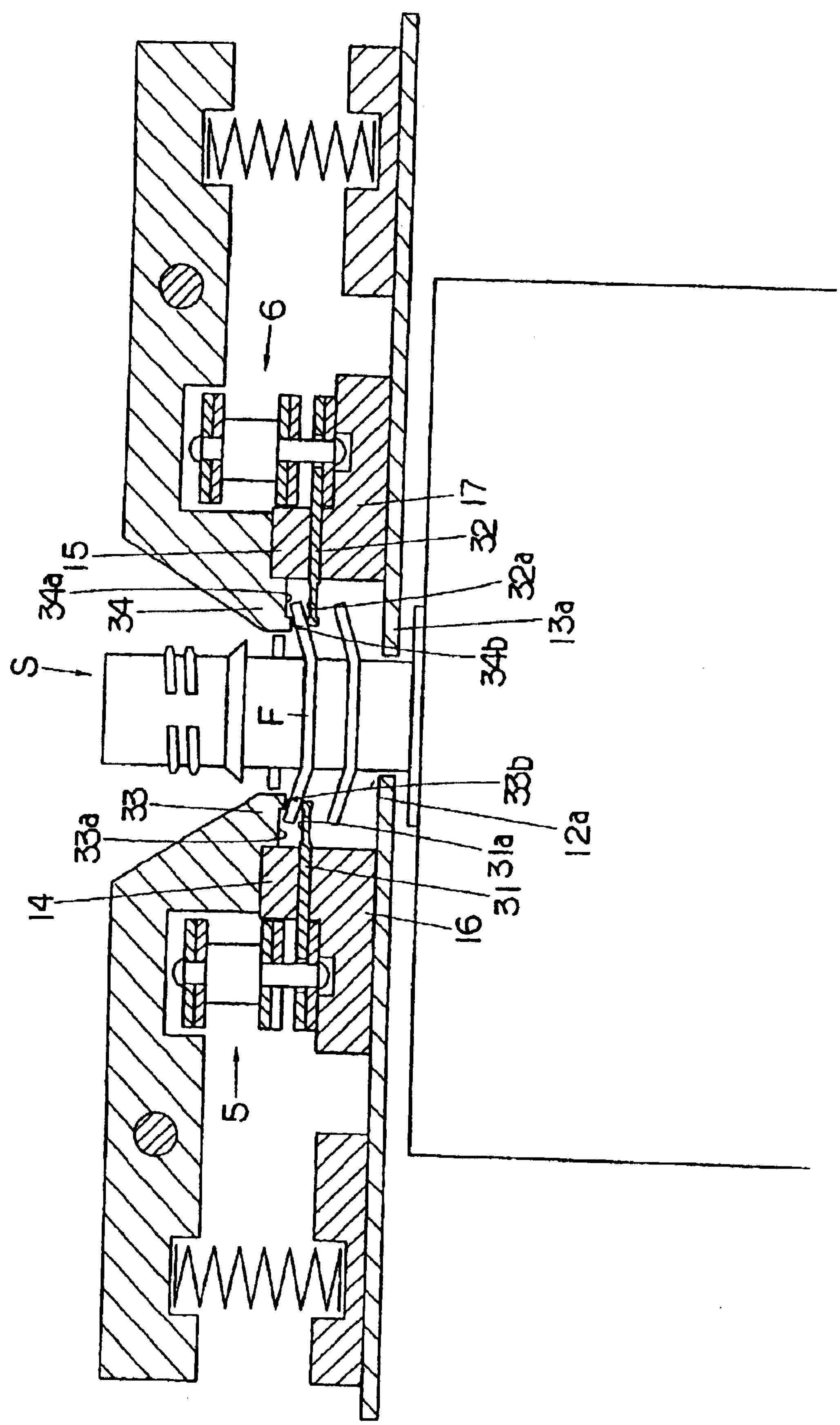
FIG. 4 is a sectional side view of another chain conveying apparatus according to the present invention.
Figure 5:
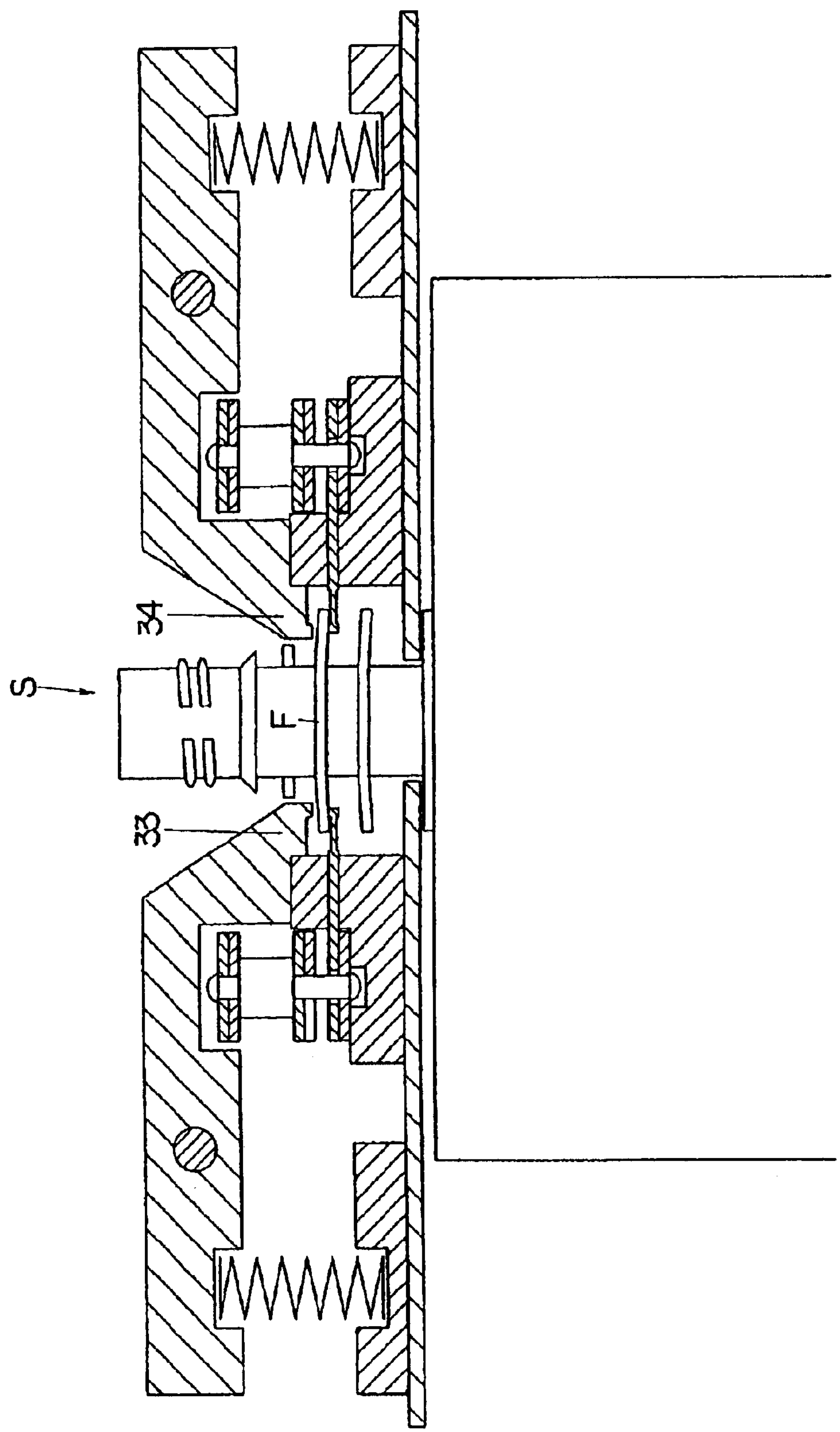
FIG. 5 is a sectional side view thereof.
Figure 6:
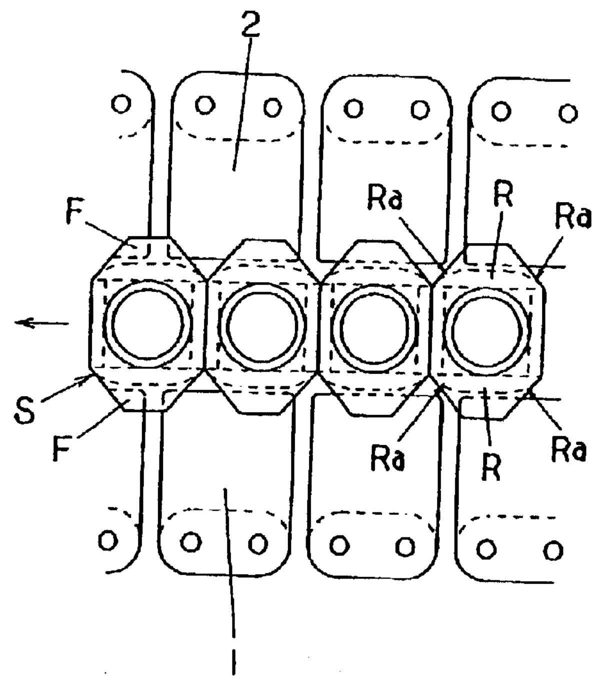
FIG. 6 is a partial top view of a conventional chain conveying apparatus.
Figure 7:
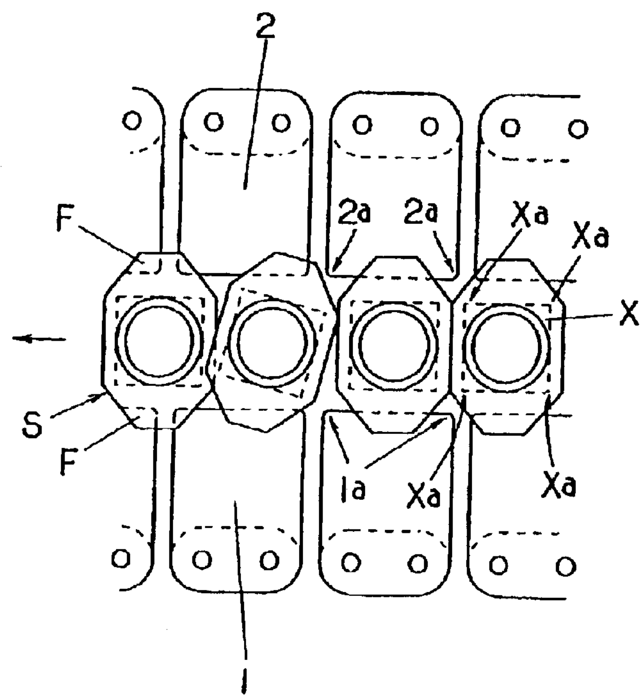
FIG. 7 is a partial top view of anther conventional chain conveying apparatus.

FIGS. 4 and 5 show another type of conveying apparatus of the present invention.

Compared to the conveying apparatus shown in FIGS. 1 through 3, the conveying apparatus of FIGS. 4 and 5 differs in terms of the shape of the areas in the vicinity of the inside end portions of the attachment plates 31 and 32 and the shape of the inside end portions of the flange regulating portions 33 and 34. Otherwise, the apparatuses of FIGS. 1 through 5 are the same.

In the conveying apparatus of FIGS. 4 and 5, relief grooves 31*a* and 32*a* are formed in the upper surfaces of the attachment members 31 and 32 along the direction of movement of the chains 5 and 6 so that the relief grooves 31*a* and 32*a* are in the vicinity of the inside end portions (such grooves can be formed in the undersurfaces). Another set of relief grooves 33*a* and 34*a* are formed in the undersurfaces of the flange regulating portions 33 and 35 along the direction of length of the above-described rectilinear region so that the relief grooves 33*a* and 34*a* are in the vicinity of the inside end portions of the flange regulating portions 33 and 34.

As seen from FIGS. 4 and 5, even in the case of spouts S in which the flanges F are greatly warped, the end portions of these flanges are accommodated in the relief grooves 31*a* and 33*a* and in the relief grooves 32*a* and 34*a*. Accordingly, the flanges F tend not to catch on the undersurfaces of the flange regulating portions 33 and 34, and smooth movement of the spouts S is accomplished.

Furthermore, if the height of the inside ends 33*b* and 34*b* of the flange regulating portions 33 and 34 is set at the same height as in the conveying apparatus shown in FIGS. 1 through 3, then the function of preventing the overlapping of the flanges F of the spouts S is the same as that in the conveying apparatus shown in FIGS. 1 through 3.

The above description is made with reference to spouts to be attached to bags; but it should be noted that the conveying apparatus of the present invention is applicable to an apparatus that conveys a spout-equipped bag (or a bag with a spout) in which a bag is sealed to a spout. Such a bag W with a spout S is shown in FIG. 2.

As seen from the above, according to the present invention, it is possible to achieve accumulation and conveying of spouts that accompanies no overlapping of the flanges of the spouts. This overlapping-free accumulation and conveying is accomplished for spouts in which the flanges of the preceding and following spouts tend to overlap during accumulation, etc. when they are conveyed by a conventional chain conveying apparatus. Furthermore, since conveying is performed with only the end portions of the flanges being supported by the attachment plates, warping of the flanges, etc., tend not to have an effect. Moreover, the problem of the corner portions of the attachment plates contacting and catching on the corners of the axial portions of the spouts so that the orientation of the spouts is disturbed can be avoided.

What is claimed is:

1. A chain conveying apparatus for spouts or bags with spouts, said apparatus comprising a pair of annular chains on which a plurality of attachment plates are provided so that said attachment plates are set in an outward facing orientation, wherein:

said annular chains are installed side by side on a same plane with a predetermined gap in between, said annular chains are rotated in opposite directions from each other and at a same speed and are moved along adjacent parallel tracks over a predetermined range, said attachment plates of respective chains are lined up in respective directions of movement in said predetermined range, and said attachment plates of both chains face each other across a predetermined gap for the length of said predetermined range so that flanges of said spouts are carried on said attachment plates and conveyed; and wherein said attachment plates are attached to said respective chains so that said attachment plates have play in a vertical direction, and said chain conveying apparatus further includes along said predetermined range:

centering guide members which are disposed at a height through which axial portions of said spouts pass, said centering guide members regulating movements of said spouts in a direction perpendicular to a direction of said movement of said attachment plates, upper-side guide members and lower-side guide members which are disposed above and below said attachment plates of said respective chains so as to regulate a height position of said attachment plates, and flange regulating members which are disposed so as to be above said flanges of said spouts, which are being conveyed, with a predetermined gap between said flange regulating members and said flanges so as to regulate an upward movement of said spouts.

2. The chain conveying apparatus according to claim 1, wherein said attachment plates are slidable between said upper-side guide members and lower-side guide members.

3. The chain conveying apparatus according to claim 2, wherein said upper-side guide members are movable upward and downward and constantly driven downward so as to be in contact with said attachment plates.

4. The chain conveying apparatus according to claim 3, wherein said upper-side guide members and said flange regulating members are disposed so as to be movable upward and downward as an integral unit.

* * * * *